UNITED STATES PATENT OFFICE 2,570,706

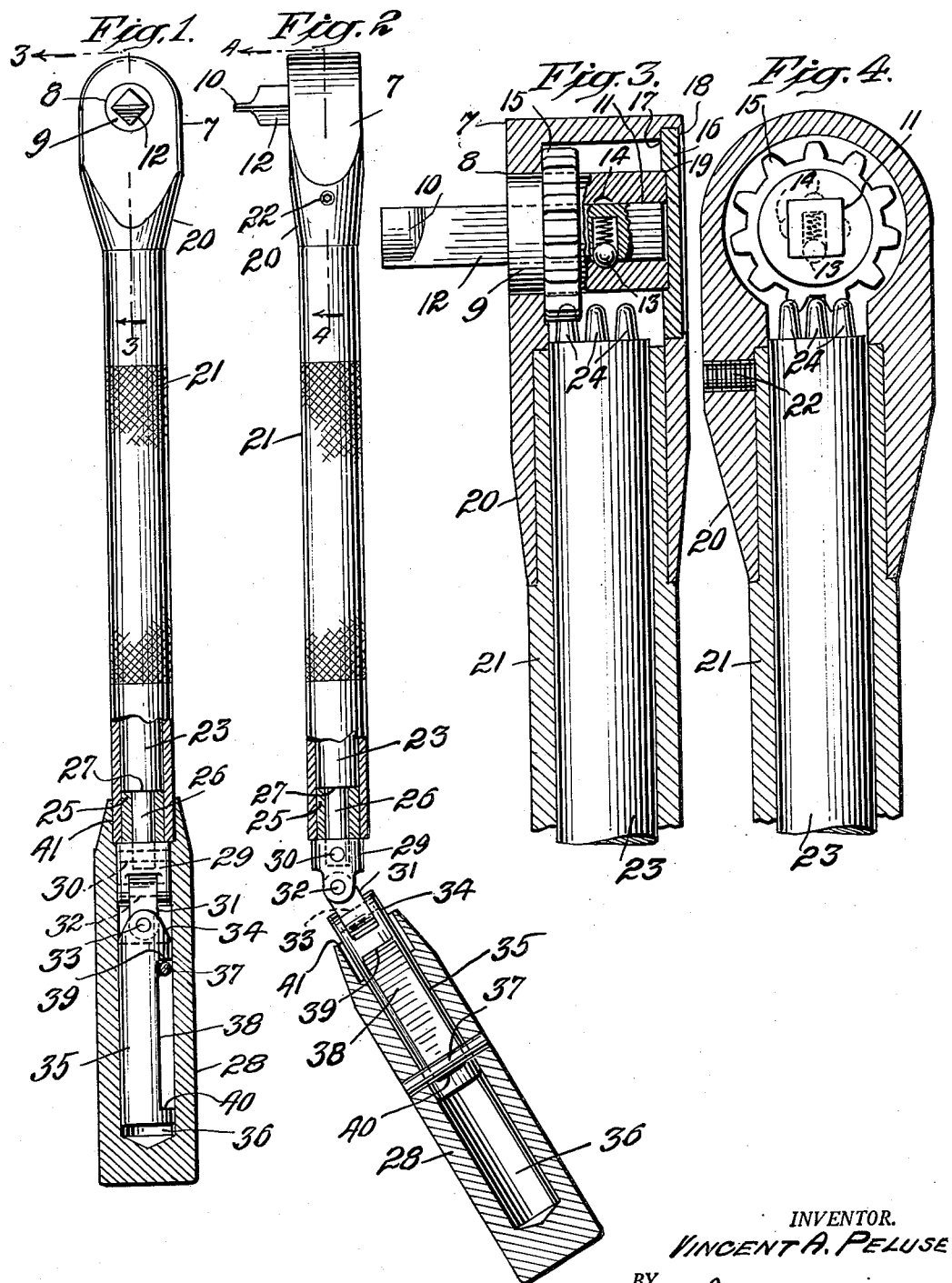

GEAR-OPERATED, ANGULARLY ADJUSTABLE WRENCH, SCREW DRIVER, OR SIMILAR DEVICE

Vincent A. Peluse, Poughkeepsie, N. Y.

Application May 22, 1950, Serial No. 163,509

1 Claim. (Cl. 81—177)

The invention disclosed in this patent application is a tool in the nature of a wrench or screw-driver, for reaching in out-of-the-way places and for turning such parts as bolts, screws, nuts, drills and the like from different angular relations.

Objects of the invention are to provide a tool of this character, of simple, substantial structure which will be readily adaptable to various conditions for enabling an operator to turn a nut, bolt or screw, for instance, which cannot be reached or operated with the tools ordinarily provided for the purpose.

Special objects of the invention are to provide this tool in a simple, sturdy, inexpensive form, made up of but few readily assembled parts.

Other desirable objects attained by the invention are set forth or will appear in the course of the following specification.

The drawing accompanying and forming part of the specification illustrates a present commercial embodiment of the invention. Structure, however, may be modified and changed as regards the immediate illustration, all within the true intent and scope of the invention as hereinafter defined and claimed.

Fig. 1 in the drawing is a broken longitudinal view showing the rotatable grip portion telescopically engaged over the tubular leverage portion of the handle;

Fig. 2 is a similar view showing the grip member pulled off in angularly extended relation;

Fig. 3 is an enlarged broken sectional detail of the head portion of the tool appearing as on substantially the plane of line 3—3 of Fig. 1;

Fig. 4 is a similar view of parts appearing as on substantially the plane of line 4—4 of Fig. 2.

The head portion of the tool is shown in the form of a hollow casing 7 having a bearing 8 in what may be considered the underside of the same, for the rotary hub 9 which is socketed to contain the screw-driver or other tool element 10.

Generally this rotary hub may have a rectangular socket 11 to non-rotatably receive the correspondingly shaped shank 12 of the tool.

The latter is shown as having a spring ball detent 13 in the side of the same to yieldingly engage in detent pockets 14 in the sides of the socket.

The tool carrying hub 9 is shown as having a toothed annular enlargement 15 in the nature of a pinion, engaging the inner wall of the housing, Fig. 3, and held in this relation by the cap 16 closing the opening 17 in the opposite or upper side of the casing, through which the hub is inserted into the casing.

This cap may be secured in place by turning the material surrounding the opening, in over the edge of the cap, as indicated at 18, and the cap is shown as having a bearing 19 sunk in its inner wall for the end of the hub 9.

At one side the casing is shown as having a tubular extension 20 substantially at a right angle to the axis of the tool, and a tubular leverage handle 21 is shown inserted in this side extension of the casing. The parts may be secured in this relation by a drive or press fit and, if desired, further, by a set screw 22.

A shaft for rotating the tool carrying hub is journaled in the tubular handle, this shaft being shown as a rod 23 fitting rotatably therein and carrying spaced, projecting, rounded pins 24 at its inner end operating as gear teeth engaging the teeth of the pinion 15.

Shaft 23 is shown as held rotatably in the tubular handle, with the gear elements in proper driving engagement with the pinion teeth, by a bushing 25 secured by a press fit or otherwise, in the outer end of the lever handle, over the reduced outer end portion 26 of the shaft and in engagement with the annular shoulder 27 which joins this reduced portion with the balance of the shaft.

A tubular grip handle 28 has a rotary slip engagement over the free end of the tubular lever handle 21 and has a universal joint connection with the outer end of the shaft, enabling the shaft to be turned by this grip when it is pulled off the lever handle and angled in different directions, as indicated in Fig. 2.

The universal joint is shown as made up of a knuckle member 29 pinned on the outer end of the shaft at 30, an intermediate link 31 swiveled to the knuckle on one axis at 32 and swiveled on a different axis at 33 to the outer knuckle member 34.

The latter is shown as having a rod extension 35 slidingly engaged in the bore 36 in the tubular grip and held against rotation or removal by a cross pin 37 extending through opposite sides of the tubular grip over the longitudinal flat 38 in one side of the enclosed rod member.

Transverse shoulders 39, 40, on the knuckle rod, at opposite ends of the flat, on engagement by the pin 37 limit the movement of the handle sleeve over the end of the handle lever and movement in the opposite direction, away from the handle lever.

The cross pin 37 is of substantial size and the flat surface 38 on the side of the knuckle rod is of substantial transverse extent so as to provide a good sliding key connection between the sleeve and rod capable of carrying the full twisting or rotating load.

The inner end of the handle sleeve is shown as internally recessed at 41 to form a bearing freely engageable over the end of the tubular lever handle to retain the sleeve rotatably engaged on the end of the lever handle in the straight handle condition of the parts shown in Fig 1.

By providing different kinds of bits for use in the tool, practically any kind of work can be performed aside from and in addition to the usual screw-driver, socket wrench, drilling operations and the like. For drilling operations the bit may be in the nature of a drill chuck. In all instances the shank of the bit is shaped to fit the square or other shaped socket in the rotatable bit holder.

With a selected bit in place, such for instance as a screw-driver bit, the tool may be used as an angle screw-driver, turning the screw in either direction, with the handle straight as in Fig. 1, either with a swinging lever action or, with the lever handle stationary, rotating the grip sleeve on the handle to turn the bit holder.

If more convenient or conditions require it, the sleeve may be slipped off the end of the lever handle into some angular relation such as indicated in Fig. 2, and in this position rotated to turn the bit, the universal joint connection permitting such operation through any desired angulation. Also, with the handle sleeve thus withdrawn and extended at an angle, it may be rotated like a crank to impart rotation to the bit.

The drive teeth on the inner end of the shaft which mesh with the pinion on the bit holder are of sufficient strength and extent to hold the bit holder against turning when the tool is used with a swinging lever action. In practice it has been found practical to provide these teeth as three equidistantly spaced, triangularly related, sturdy, rounded pins set in the end of the shaft rod.

The tool consists of but few parts and these are all of simple, rugged construction, readily manufactured and quickly and easily assembled. The relation of parts is such that the tool is of small dimensions and therefore can be used to operate in small, out-of-reach places.

The tubular lever handle may be knurled or roughened to afford a good hand grip and the sleeve which is rotatable over the end of this handle may be of hexagonal or other shape affording a proper grip for the hand operating the same. This sleeve provides a good hand grip for operating the tool as a straight lever as well as providing the means for independently rotating the bit holder in the head of the tool.

What is claimed is:

A gear operated, angularly adjustable wrench, screw-driver or similar device comprising an operating head, a tool carrying shaft journaled in said head, a tubular leverage handle projecting angularly from one side of said head and forming a lever for rotating the head about the axis of the tool carrying shaft, a drive shaft journaled in said leverage handle and geared at its inner end to said tool carrying shaft for rotating the latter independently of rotation of the head about said axis, a tubular, rotary handle rotatably and telescopically engageable with and disengageable from said leverage handle to form a separable rotary leverage extension of the leverage handle and a universal joint connection between said drive shaft and said rotary handle including a member slidingly and non-rotatably keyed to said rotary handle and interconnected universal joint elements connected with the outer end of said drive shaft and with said slidingly keyed member, respectively, and operable to effect turning of said drive shaft both when said rotary handle is rotatably telescopically engaged with said leverage handle or is disengaged therefrom.

VINCENT A. PELUSE.

REFERENCES CITED

The following references are of record in the file of this patent:

UNITED STATES PATENTS

| Number | Name | Date |
|---|---|---|
| 1,016,607 | Booman | Feb. 6, 1912 |
| 1,273,774 | Golding et al. | July 23, 1918 |
| 1,295,799 | Sanborn | Feb. 25, 1919 |
| 1,385,214 | Klopper | July 19, 1921 |
| 1,398,116 | Root | Nov. 22, 1921 |
| 1,659,838 | Schoeb | Feb. 21, 1928 |
| 2,182,673 | Magnano | Dec. 5, 1939 |
| 2,316,243 | Hubbard | Apr. 13, 1943 |